United States Patent
Wang

(10) Patent No.: US 7,235,755 B2
(45) Date of Patent: Jun. 26, 2007

(54) INPUT DEVICE FOR A CELLULAR PHONE

(75) Inventor: Cheng-Lin Wang, Yi Lan Hsien (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 11/397,512

(22) Filed: Apr. 4, 2006

(65) Prior Publication Data

US 2006/0181509 A1   Aug. 17, 2006

(30) Foreign Application Priority Data

Apr. 29, 2005   (TW) ............................... 94114027 A

(51) Int. Cl.
*H01H 1/10* (2006.01)

(52) U.S. Cl. .................. 200/512; 200/302.1; 200/302.2

(58) Field of Classification Search ................ 200/512, 200/513, 302.1, 302.2

See application file for complete search history.

(56) References Cited

U.S. PATENT DOCUMENTS 4,338,502 A * 7/1982 Hashimoto et al. ......... 200/512
5,545,865 A * 8/1996 Gotou ......................... 200/341
6,488,425 B1 * 12/2002 Spence et al. .............. 400/714
2004/0182687 A1 * 9/2004 Tsubaki ...................... 200/341

* cited by examiner

Primary Examiner—Elvin Enad
Assistant Examiner—Lheiren Mae A. Anglo
(74) Attorney, Agent, or Firm—Ladas & Parry LLP

(57) ABSTRACT

An input device includes a casing having a retention groove, a flexible membrane disposed on the casing and having a plurality of keys, a connecting portion an outer flange extending outwardly from an outer surface of the connecting portion, an upper recess formed on an inner surface of the connecting portion, and a lower recess formed on the inner surface below the upper recess, and a fixing ring for disposing below the flexible membrane so as to be received in one of the upper and lower recesses. Disposing the fixing ring below the flexible membrane in the lower recess after insertion of the outer flange of the flexible membrane into the retention groove results in fixing of the outer flange of the flexible membrane within the retention groove.

16 Claims, 6 Drawing Sheets

INPUT DEVICE FOR A CELLULAR PHONE

FIELD OF THE INVENTION

The present invention relates to an input device, more particularly to a cellular phone that includes an outer casing and an input device provided on the casing in such a manner to prevent from untimely and undesired disengagement of the input device from the outer casing of the cellular phone.

BACKGROUND OF THE INVENTION

Due to prevalence and wide use of cellular phones, a cellular phone becomes one of the most purchased electronic items in the market. A compact ones rapidly replaces the bulky cellular phone sets, since the latter possesses some TV games in addition to the traditional communication ability. For those teenagers who are in a trend to follow the latest fashions and new tastes, the manufacturer of the cellular phones have invented a cellular phone having some parts (such as an input device or an outer casing) to be replaced with new designs by DIY means. It is noted that the input device presently used in the conventional cellular phone is replaceable. However, the replacing operation is somewhat difficult and includes several complicated steps. In case of an accidental fall from the user's hand, the input device disengages easily from the main body of the conventional cellular phone.

FIG. 1 shows an exploded and perspective view of a conventional input device 1 to include a casing 10, a flexible membrane 11, and a printed circuit plate 12.

The casing 10 has a coupling face 101 and a periphery confining the coupling face 101. The casing 10 further has a plurality of through holes 102 formed through the coupling face 101 and a plurality of retention recess 103 surrounding the holes 102. The flexible membrane 11 has a plurality of input keys 111, a periphery confining the input keys 111, and a plurality of inserts 112 extending outwardly from the periphery. Once the flexible membrane 11 is coupled to the coupling face 101 of the casing 10, the inserts 112 extend respectively into the retention recess 103 of the casing 10, thereby preventing disengagement of the flexible membrane 11 from the casing 10. The printed circuit plate 12 is disposed within the casing 10 below the coupling face 101 thereof, and has a plurality of actuators 121 extending respectively through the holes 102 on the coupling face 101 to make contact with the input keys 111 of the flexible membrane 11. Under this condition, pressing of one of the input keys 111 will result in depression of the respective actuator 121, which, in turn, results in a data input operation.

FIG. 2 shows a sectional view of another conventional input device 20 used in a cellular phone. As shown, the conventional input device 20 includes a flexible membrane 201 having a plurality of inserts 202 extending respectively into the retention recesses 206 of the casing, and a plurality of lower projections 203 in contact with the actuators 204 of the printed circuit board 205 disposed within the casing below the flexible membrane 201. Pressing of the flexible membrane 201 will result in depression of the lower projection 203 against the actuator 204, which, in turn, results in a data input operation.

Though the aforesaid input device allows users to replace different flexible membranes, the flexible membrane may easily disengage the casing in case of an accidental fall since the inserts 112, 202 are not retained within the retention recesses 103, 206 of the casing in a tight-fit manner. No other fastening device is employed in the conventional input device in order to prevent untimely removal of the flexible membrane from the casing.

SUMMARY OF THE INVENTION

The object of the present invention is to provide a cellular phone having an input device mounted in such a manner that untimely and undesired removal of a flexible membrane from a casing can be prevented, thereby eliminating the disadvantage encountered during use of the conventional cellular phone.

In accordance with the present invention, an input device for a mobile phone is provided to include: a casing having a coupling face formed with a retention groove; a flexible membrane disposed on the coupling face of the casing, having a plurality of input keys, a connecting portion, an outer flange extending outwardly from an outer surface of the connecting portion, an upper recess formed on an inner surface of the connecting portion, and a lower recess formed on the inner surface below the upper recess; and a fixing ring for disposing below the flexible membrane so as to be received in one of the upper and lower recesses of the flexible membrane. Disposing the fixing ring below the flexible membrane in the lower recess after inserting the outer flange of the flexible membrane into the retention groove results in fixing of the outer flange of the flexible membrane within the retention groove.

In another aspect of the present invention, a method for assembling an input device for a mobile phone is mentioned. The mobile phone includes a casing having a coupling face formed with a retention groove; a flexible membrane disposed on the coupling face, having a plurality of input keys, a connecting portion, an outer flange extending outwardly from an outer surface of the connecting portion, an upper recess formed on an inner surface of the connecting portion, and a lower recess formed on the inner surface of the connecting portion below the upper recess; and a fixing ring for retaining the flexible membrane in the retention groove. The assembling method includes the steps of: (1) disposing the fixing ring below the flexible membrane; (2) inserting the outer flange of the flexible membrane into the retention groove in such a manner that the fixing ring is received in upper recess of the flexible membrane; and (3) pressing the flexible membrane in order to move the fixing ring from the upper recess into the lower recess of the flexible membrane so that the outer flange of the flexible membrane is retained within the retention groove.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTIONS OF THE PREFERRED EMBODIMENT

Figure 1:
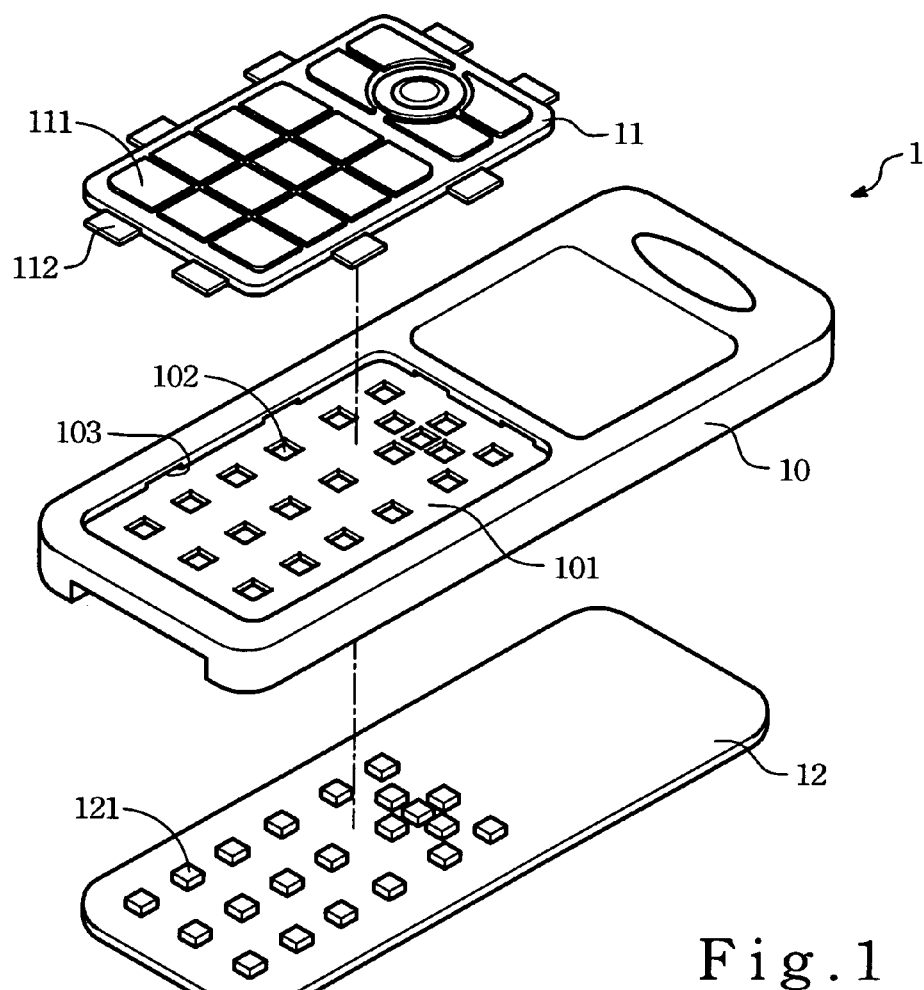
FIG. 1 is an exploded and perspective view of a conventional input device for use in a cellular phone.
Figure 2:
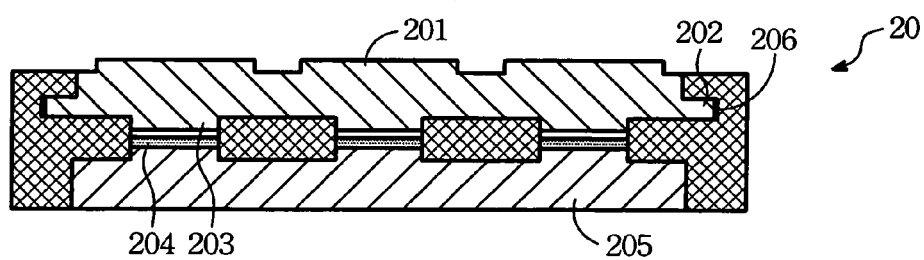
FIG. 2 is a sectional view of another conventional input device for use in a cellular phone.
Figures 3A, 3B:
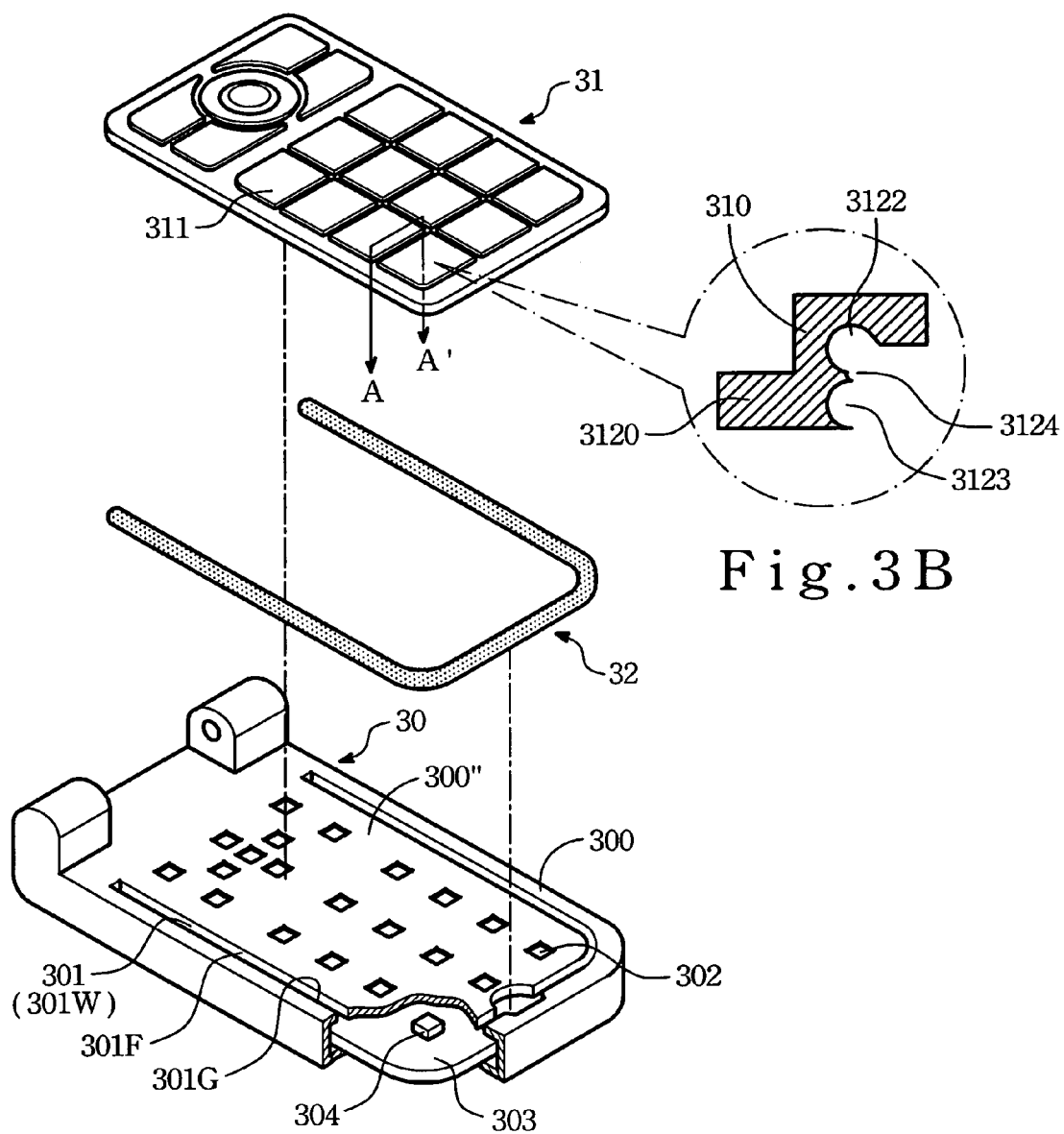
FIG. 3A is an exploded and perspective view of the preferred embodiment of an input device of the present invention for use in a cellular phone.
FIG. 3B is a sectional view of a flexible membrane taken along A-A' line in FIG. 3A.

Referring to FIGS. 3A and 3B, an exploded and perspective view of the preferred embodiment of an input device of a cellular phone of the present invention is provided, including a casing 30, a flexible membrane 31, and a U-shaped fixing ring 32. Generally, the outer casing of the cellular phone serves as the casing 30 in case the cellular phone is a single-piece member; however, in case the cellular phone is a foldable type (i.e. a flip phone) and includes a main body and a cover member pivotally attached to the main body, the main body serves as the casing 30. Therefore, employment of the input device of the present invention should not be limited to any particular type of the cellular phones.

The casing 30 is made from any material (such as plastic) having a substantial stiffness to provide rigidity thereof. The casing 30 includes an upper plate 300 that serves as a coupling face 300" and has a periphery confining the coupling face 300". The upper plate 300 is formed with a plurality of through holes 302 and a U-shaped retention groove 301 surrounding the through holes 302 since the former is formed adjacent to the periphery thereof. In this embodiment, the retention groove 301 is defined by a groove-confining wall 301W having two closed ends, an outer wall portion 301G adjacent to the periphery confining the coupling face 300", and an inner wall portion 301F opposite to the outer wall portion 301G (see FIG. 3A). The outer and inner wall portions 301G, 301F are connected to the closed ends. The outer wall portion 301G has a dented portion serving as a removal recess 305 (see FIG. 4B) to facilitate removal of the flexible member 31 from the retention groove 301. The purpose of the removal recess 305 will be explained in the following paragraphs.

The flexible membrane 31 is made from silicon rubber, is formed as a single-piece member, and has a configuration that complements with the retention groove 301 on the upper plate 300. The flexible membrane 31 is disposed on the upper plate 300 of the casing 30, and has a plurality of input keys 311 and a connecting portion 310 extending downwardly from a periphery confining the input keys 311. FIG. 3B is a sectional view of the flexible membrane 31 taken along lines A-A' in FIG. 3A. The flexible membrane 31 further has an outer flange 3120 extending outwardly from an outer surface of the connecting portion 310, an upper recess 3122 formed on an inner surface of the connecting portion 310, and a lower recess 3123 formed on the inner surface of the connecting portion 310 below the upper recess 3122. The inner surface of the connecting portion 310 is further formed with a spacer 3124 for separating the upper and lower recesses 3122, 3123 apart from each other.

Figure 4A:
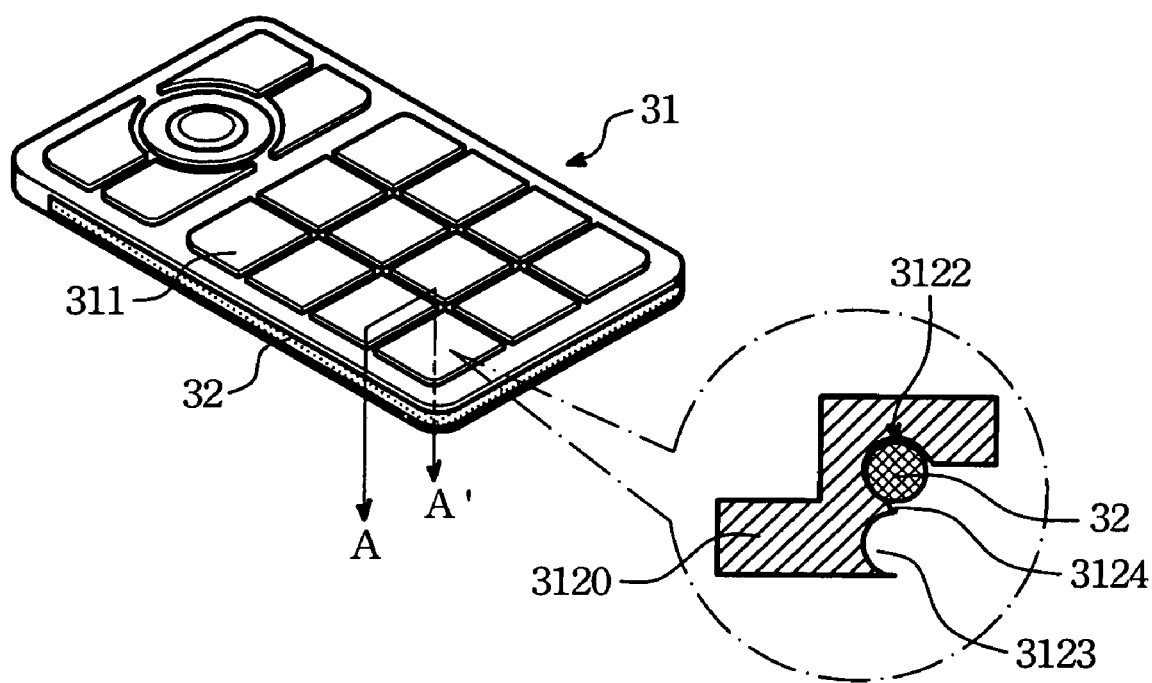
FIG. 4A illustrates how a fixing ring is mounted to a flexible membrane of the input device of the present invention.
Figure 4B:
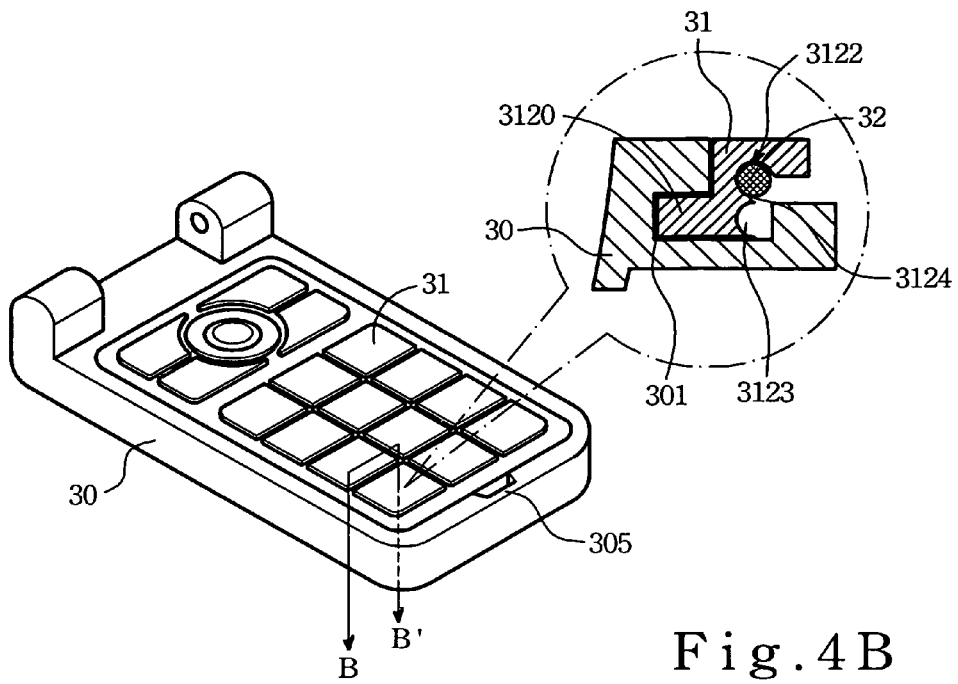
FIG. 4B is a sectional view of the input device of the present invention, illustrating the flexible membrane is retained in the casing of the input device and the fixing ring is received in the upper recess.
Figure 4C:
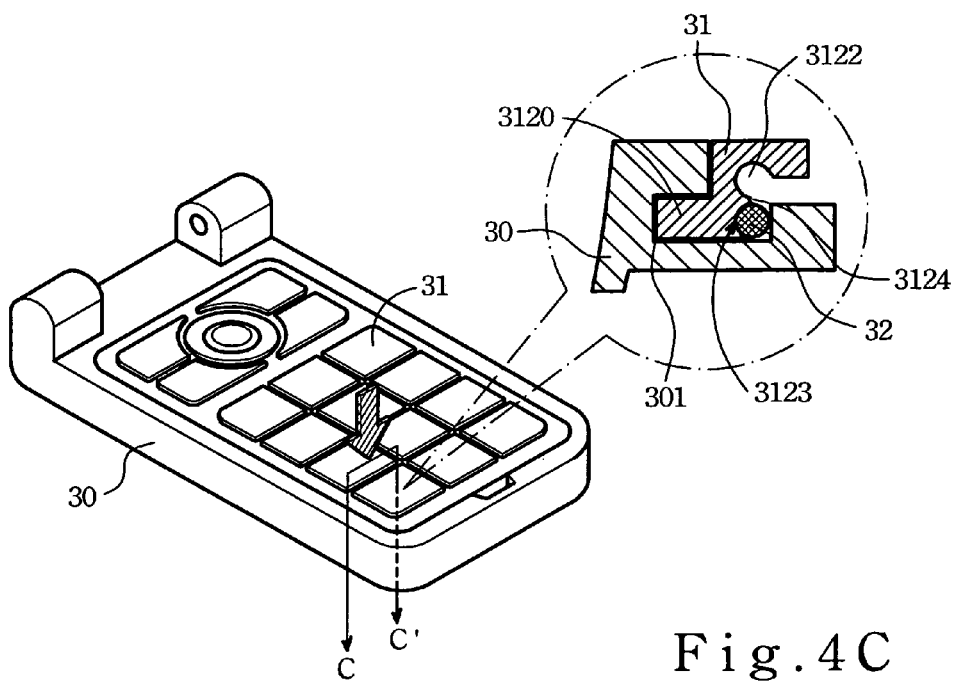
FIG. 4C is a sectional view of the input device of the present invention, illustrating the flexible membrane is retained in the casing of the input device and the fixing ring is received in the lower recess.

The fixing ring 32 is disposed below the flexible membrane 31 so as to be received in one of the upper and lower recesses 3122, 3123 of the connecting portion 310 of the flexible membrane 31. The fixing ring is generally U-shaped, and is made from aluminum alloy. Referring to FIGS. 4A and 4B, wherein the encircled portion illustrates a sectional view taken along the line A-A' (B-B'), where the fixing ring 32 is received in the upper recess 3122 of the connecting portion 310, the flexible membrane 31 can be bended and pressed downward in such a manner to insert the outer flange 3120 of the connecting portion 310 into the retention groove 301 in the upper plate 300. Under this condition, the outer flange 3120 is retained within the retention groove 301 in the upper plate 300 in a tight-fit manner upon removal of the applied pressure. FIG. 4C, wherein the encircled portion illustrates a sectional view taken along the line C-C', shows the fixing ring 32 being received in the lower recess 3123 of the connecting portion 310 after an external force exerted by a user to press the fixing ring 32 from the upper recess 3122 to the lower recess 3123, the outer flange 3120 of the connecting portion 310 is retained within the retention groove 301 in the upper plate 300 of the casing 30 in a tight-fit manner, thereby preventing untimely and undesired removal of the flexible membrane 31 from the casing 30.

Referring again to FIG. 3A, the input device of the present invention further includes a printed circuit board 303 disposed within the casing 30 below the upper plate 300. The circuit board 303 has a plurality of actuators 304 respectively extending through the holes 302 on the upper plate 300 to make contact with the input keys 311 of the flexible membrane 31 (not shown). Each actuator 304 can be made from an elastomeric material with an electrical contact (not shown) for contacting a contact (not shown) of the printed circuit board 303 in order to form an electrical communication. The printed circuit board 303 can be provided with a signal-processing circuit for processing signals. Since the relevant feature of the present invention does not reside in the structure of the printed circuit board 303, a detailed description of the printed circuit board 303 is omitted herein for the sake of brevity.

Figure 5A:
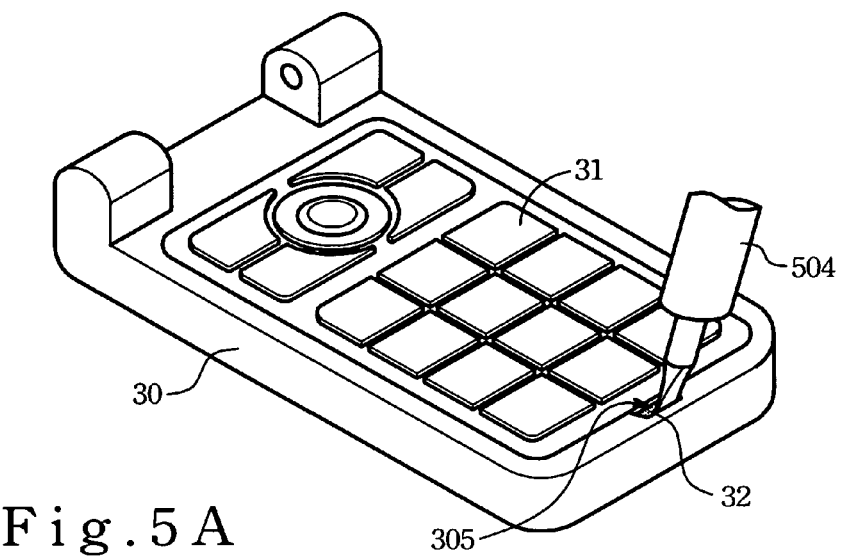
FIG. 5A is a perspective view of the input device of the present invention, illustrating how the flexible membrane is removed from the casing by using a screw drive.
Figure 5B:
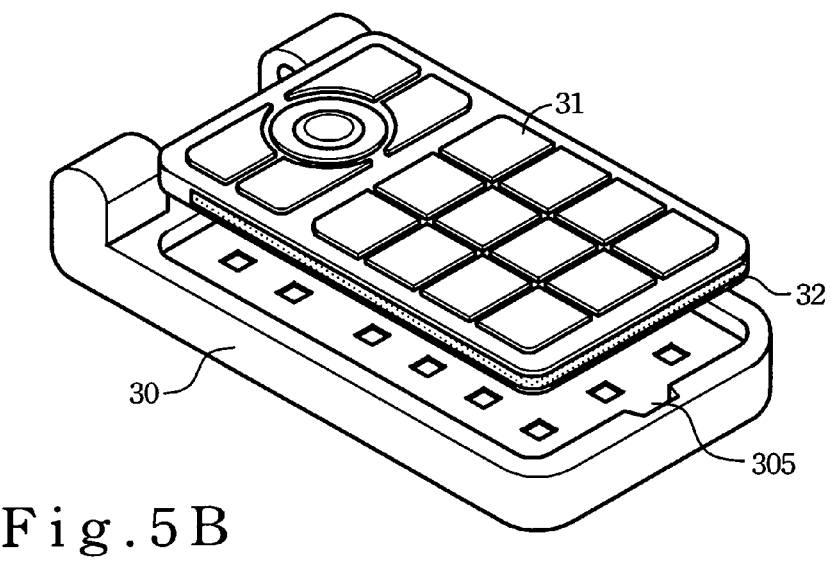
FIG. 5B shows a partly exploded view of the input device of the present invention.

Referring to FIGS. 5A and 5B, in case the user of the cellular phone provided with the input device of the present invention wishes to replace the flexible membrane 31 by a new design, he or she can simply remove the flexible membrane 31 by inserting a tool 504 (such a screw driver) into the removal recess 305 in the upper plate of the casing 30. He needs to exert a small force to remove the flexible membrane 31 from the retention groove 301 since the periphery of the upper plate 300 serves as the fulcrum of the tool 504. Later, the fixing ring 32 is removed from the flexible membrane 31 and is disposed within the new flexible membrane prior to fixing the whole assembly onto the upper plate of the casing 30 again.

Figure 6:
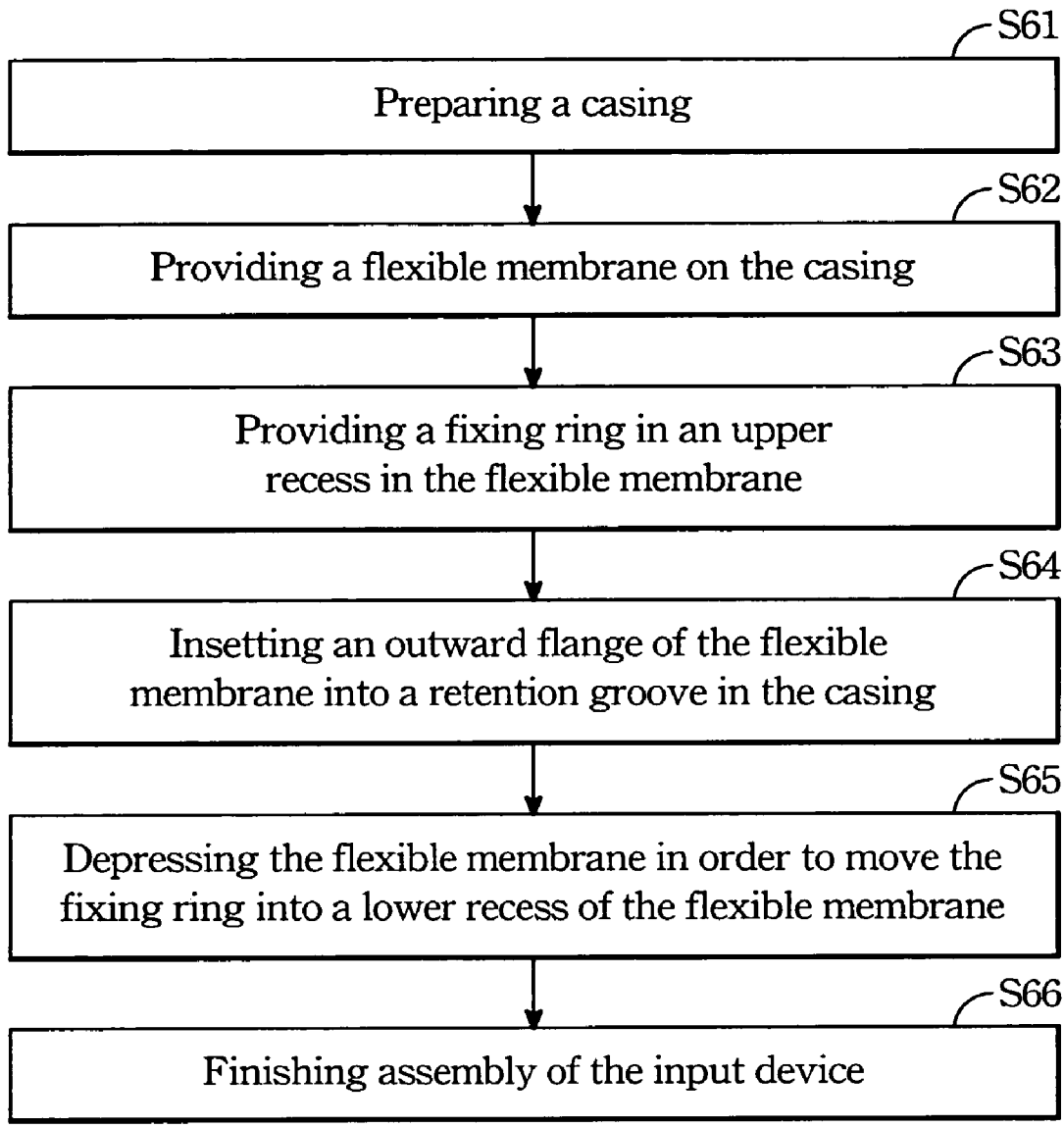
FIG. 6 is a block diagram, illustrating the steps for assembling the input device of the present invention for use in a cellular phone.

FIG. 6 shows a block diagram, illustrating the steps for assembling the input device of the present invention. According to the step S61, a casing 30 is provided in such a manner that it has an upper plate 300 (see FIG. 3A) that defines a coupling face and that has a periphery confining the coupling face. The upper plate 300 is formed with a retention groove 301 adjacent to the periphery. According to the step S62, a flexible membrane 31 is provided on the upper plate 300 of the casing 30. The flexible membrane 31 has a plurality of input keys 311 and a connecting portion 310 extending downwardly from a periphery confining the input keys 311. The flexible membrane 31 further has an outer flange 3120 extending outwardly from an outer surface of the connecting portion 310, an upper recess 3122 formed on an inner surface of the connecting portion 310, and a lower recess 3123 formed on the inner surface of the connecting portion 310 below the upper recess 3122. According to the step S63, a fixing ring 32 is disposed below the flexible membrane 31 in such a manner that the fixing ring 32 is received in the upper recess 3122 of the connecting portion 310 of the flexible membrane 31. According to the step S64, the outer flange 3120 of the flexible membrane 31 is inserted into the retention groove 301 in the casing 30. According to the step S65, the periphery of the upper plate 300 of the casing 30 is pressed downward in such a manner to move the fixing ring 32 from the upper recess 3122 into the lower recess 3123 in the connecting portion 310 of the flexible membrane 31 so that the outer flange 3120 of the flexible membrane 31 is retained within the retention groove 301 in the casing 30 in a tight-fit manner, thereby preventing untimely and undesired removal of the flexible membrane from the casing 300, according to the step S66.

By virtue of arrangement of the input device of the present invention in a cellular phone, the flexible membrane 31 can be easily replaced by a new one and yet firmly retained within the cellular phone, thereby overcoming the disadvantage encountered by the conventional input device of a cellular phone.

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An input device for a mobile phone, comprising:
   a casing having a coupling face formed with a retention groove;
   a flexible membrane disposed on said coupling face, having a plurality of input keys, a connecting portion with an outer flange extending outwardly from an outer surface of said connecting portion, an upper recess formed on an inner surface of said connecting portion, and a lower recess formed on said inner surface below said upper recess; and
   a fixing ring for disposing below said flexible membrane so as to be received in one of said upper and lower recesses of said flexible membrane;
   whereby, disposing said fixing ring below said flexible membrane in said lower recess after insertion of said outer flange of said flexible membrane into said retention groove results in fixing of said outer flange of said flexible membrane within said retention groove.

2. The input device according to claim 1, further comprising a circuit board disposed within said casing below said coupling face, said circuit board having a plurality of actuators respectively aligned with said input keys of said flexible membrane.

3. The input device according to claim 1, wherein said inner surface of said connecting portion is further formed with a spacer for separating said upper and lower recesses apart from each other.

4. The input device according to claim 1, wherein said retention groove is defined by a groove-confining wall having an outer wall portion and an inner wall portion facing opposite to said outer wall portion, said outer wall portion having a dented portion serving as a removal recess to facilitate removal of said flexible membrane from said retention groove.

5. The input device according to claim 1, wherein said fixing ring is made from aluminum alloy and is U-shaped.

6. The input device according to claim 1, wherein said flexible membrane is made from silicon rubber and is formed as a single-piece member.

7. The input device according to claim 1, wherein said retention groove is defined by a groove-confining wall having two closed ends and outer and inner wall portions interconnecting said closed ends, said fixing ring having a configuration to complement with said retention groove.

8. The input device according to claim 1, wherein said fixing ring has a U-shaped configuration, said retention groove having a complementing configuration to said fixing ring.

9. The input device according to claim 1, wherein said coupling face of said casing is further formed with a plurality of through holes, said actuators of said circuit board extending respectively through said through holes to make contact with said input keys of said flexible membrane.

10. A method for assembling an input device for a mobile phone, the mobile phone including a casing having a coupling face formed with a retention groove; a flexible membrane for disposing on the coupling face, having a plurality of input keys, and a connecting portion with an outer flange extending outwardly from an outer surface of the connecting portion, an upper recess being formed on an inner surface of the connecting portion, and a lower recess being formed on the inner surface of the connecting portion below the upper recess; and a fixing ring for retaining the flexible membrane in the retention groove; the assembling method comprising:
   (1) disposing the fixing ring below the flexible membrane;
   (2) inserting the outer flange of the flexible membrane into the retention groove in such a manner that the fixing ring is received in the upper recess of the flexible membrane; and
   (3) pressing the flexible membrane in order to move the fixing ring from the upper recess into the lower recess of the flexible membrane so that the outer flange of the flexible membrane is retained within the retention groove.

11. The method according to claim 10, wherein the inner surface of the flexible membrane is further formed with a spacer for separating the upper and lower recesses apart from each other.

12. The method according to claim 10, wherein the retention groove is defined by a groove-confining wall having an outer wall portion and an inner wall portion facing opposite to the outer wall portion, the outer wall portion having a dented portion serving as a removal recess to facilitate removal of the flexible membrane from the retention groove.

13. The method according to claim 10, wherein the fixing ring is made from aluminum alloy and is U-shaped.

14. The method according to claim 10, wherein the flexible membrane is made from silicon rubber and is formed as a single-piece member.

15. The method according to claim 10, wherein the retention groove is defined by a groove-confining wall having two closed ends and outer and inner wall portions interconnecting the closed ends, the fixing ring having a configuration to complement with the retention groove.

16. The method according to claim 10, wherein the fixing ring has a U-shaped configuration, the retention groove having a complementing configuration to the fixing ring.

* * * * *